United States Patent [19]

Hopkins

[11] 4,312,300

[45] Jan. 26, 1982

[54] SHEEP HANDLING APPARATUS AND METHODS OF HANDLING SHEEP

[75] Inventor: Donald L. Hopkins, Victoria, Australia

[73] Assignee: Alf Hannaford & Co. Pty. Ltd., Beverley, Australia

[21] Appl. No.: 127,758

[22] Filed: Mar. 6, 1980

[30] Foreign Application Priority Data

Mar. 7, 1979 [AU] Australia ............................. PD7943

[51] Int. Cl.[3] ......................... A61D 3/00; A01K 15/00

[52] U.S. Cl. ........................................ 119/98; 119/103

[58] Field of Search ..................... 119/98, 99, 103, 155

[56] References Cited

U.S. PATENT DOCUMENTS 1,444,711 2/1923 Sherwood et al. ................... 119/98
2,786,449 3/1957 Dahlerup .............................. 119/99
4,116,166 9/1978 Gofflot .................................. 119/99

*Primary Examiner*—Gene Mancene
*Assistant Examiner*—Robert P. Swiatek
*Attorney, Agent, or Firm*—Oldham, Oldham, Hudak & Weber Co.

[57] ABSTRACT

An arrangement for assisting handling of sheep which comprises a pen having at each end gates which can be both opened or closed simultaneously and which are used by being opened to attract sheep within the pen and there is provided an automatic device to effect a closing of both gates upon location of the sheep within the pen. Members are provided to automatically re-open the gates with the withdrawal of a sheep from the side of the pen using the movement of a divertible panel in the side. There are also other members to assist causing a sheep to be off balance when in the pen to assist in withdrawal from the side.

7 Claims, 4 Drawing Figures

SHEEP HANDLING APPARATUS AND METHODS OF HANDLING SHEEP

Figure 1:
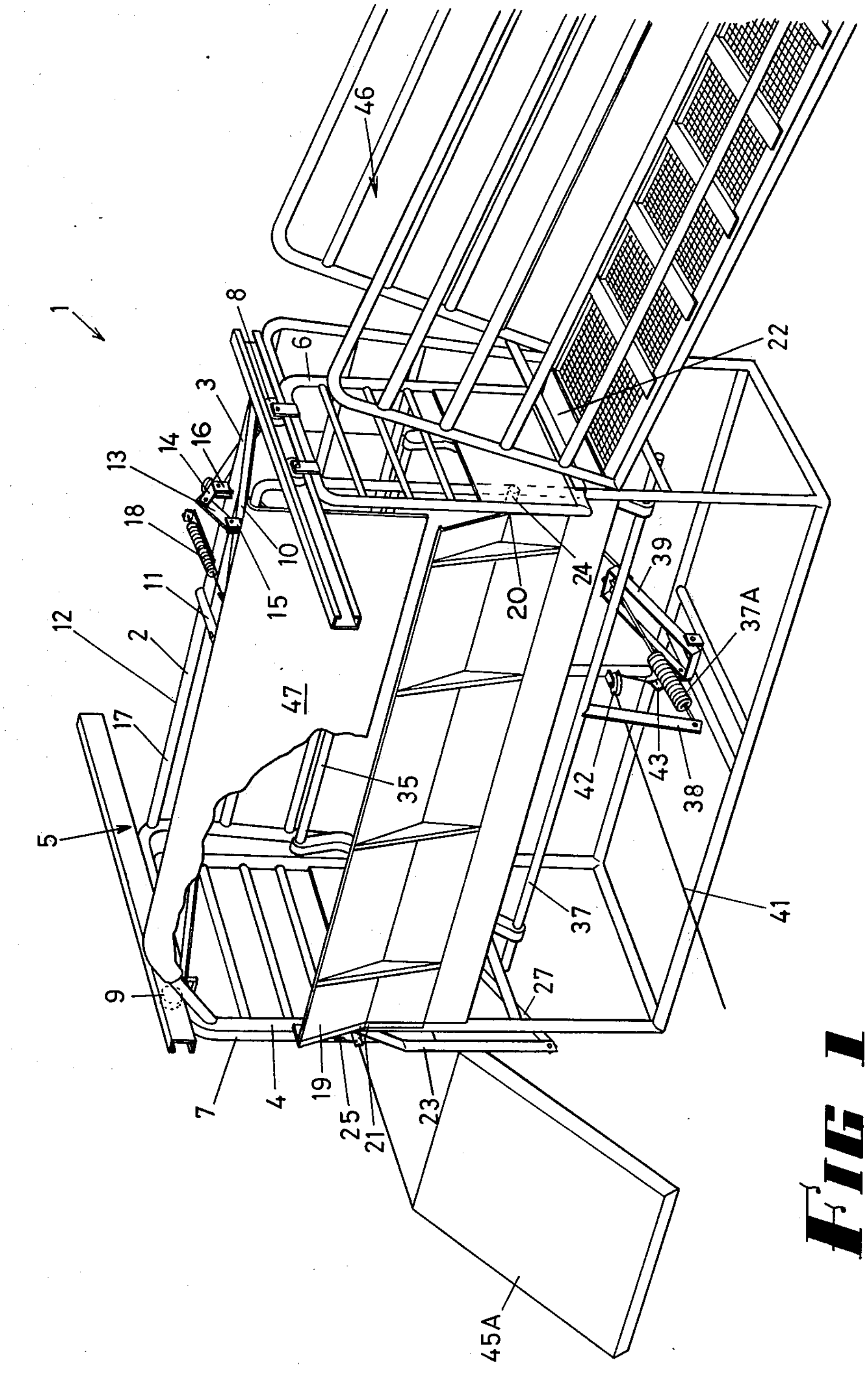

This invention relates to an apparatus useful for assisting in the handling of sheep and to a method of handling sheep.

The problem to which this invention is directed is the difficulty of causing sheep to move from time to time without undue force being necessary.

If any action is required such as mulesing or crutching of sheep or even shearing of sheep, with the significant cost of labour it is preferable that the sheep might be persuaded to transport themselves to a location where they are available from time to time for the person performing the task on the sheep.

I have previously proposed improvements to races but this invention relates to problems concerning a pen into which the sheep are to be enticed and from which each sheep can be withdrawn from time to time to be directly located on the apparatus suitable for effecting the operation on the sheep.

In conventional apparatus hitherto, such an arrangement will rely upon the sheep being forced into the pen perhaps by pressure from behind or fear but it is a constant problem to cause the sheep to consistently file into a pen from where they will be spasmodically taken.

This invention accordingly proposes an arrangement for assisting handling of sheep which includes a pen having two sides oppositely positioned about, and thereby defining, a chute, and, at each end of the chute, a gate adapted to close the pen at its end, each gate positioned and adapted with the chute so that a sheep entering the chute from an inlet end and entering past a first of the said gates, can discern an open status of the gate at the other end of the chute, detection and closure means within the pen adapted to detect the presence of a sheep within the pen and adapted to close both said gates upon such detection, and a first of the said two sides having withdrawal means adapted to permit a sheep to be selectively moved through the said side to effect withdrawal of the sheep from the pen.

The concept then is to provide that with the two gates being opened, the sheep discerns a chute without restriction and it has been found that sheep appear to prefer to walk through such a pen with such an apparent open status whereas if the pen is in effect closed, it is much more difficult to cause the sheep to enter the pen.

The enticement of the sheep into the pen with the open status can be further promoted by arranging that a sheep will pass across the apparently open gate at an appropriate time which it is suggested will entice a sheep intending to enter the pen to proceed forward to in effect follow the leader.

This is convenient especially if a sheep has been worked upon and after such operation is let to go through a chute which is positioned across the end of the pen so that as the sheep passes this he will presumably attract the next sheep into the pen.

Effecting withdrawal of a sheep can be achieved very conveniently by providing a panel in one side of the pen with a horizontal pivot support axis below the expected centre of gravity of the sheep that is relative to the height above the floor of the centre of gravity of the sheep so that an operator can grab the wool of a sheep and pull this through the side which action will of course divert the panel.

A preferred feature of this invention is to couple the panel thus diverted with the gates to be opened or closed so that such diverting action will open the gates and thereby provide the apparent open status of the pen to entice the next sheep into the pen.

Of course at the same time it "sets" the detection means whereby upon discovery of entry of the animal fully within the pen, this will allow the gates to close thereby trapping the animal pending removal from the side.

It has been found very useful, in the removal of a sheep from the side, that if the sheep is caused to be off balance, it is more easily pulled through the side.

While this can be achieved in several ways, in one preferred manner, there is provided a pressure member movably supported relative to the pen and adapted in one position to be in an adjacent position relative to a sheep in the pen and to be adapted to be moved to press against the side of the sheep in the pen which side is opposite the panel through which the sheep can be removed so as to assist in removal of the sheep from the side of the pen upon closure of the gates.

The mechanisms by which the various couplings are achieved can be altered but are all adapted to perform the functions described in the best manner.

For a better understanding of this invention it will now be described with the assistance of drawings it being noted that other features of the invention may be had by reference to the accompanying claims appended at the end of this description.

Figure 2:
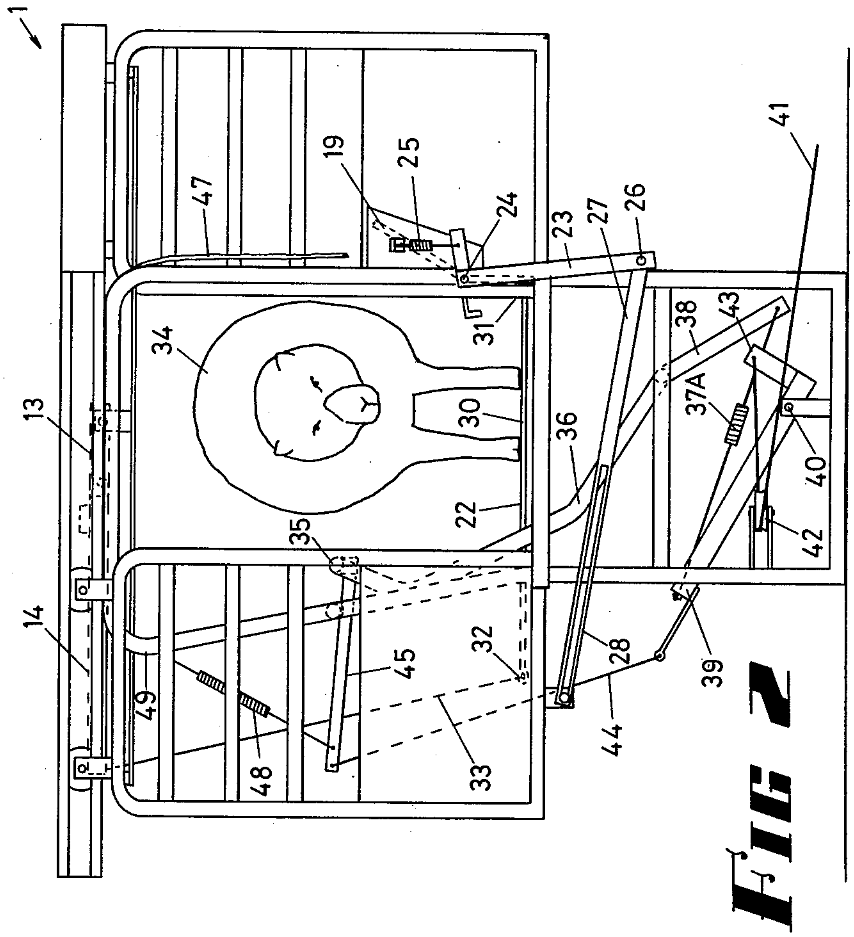
Figure 3:
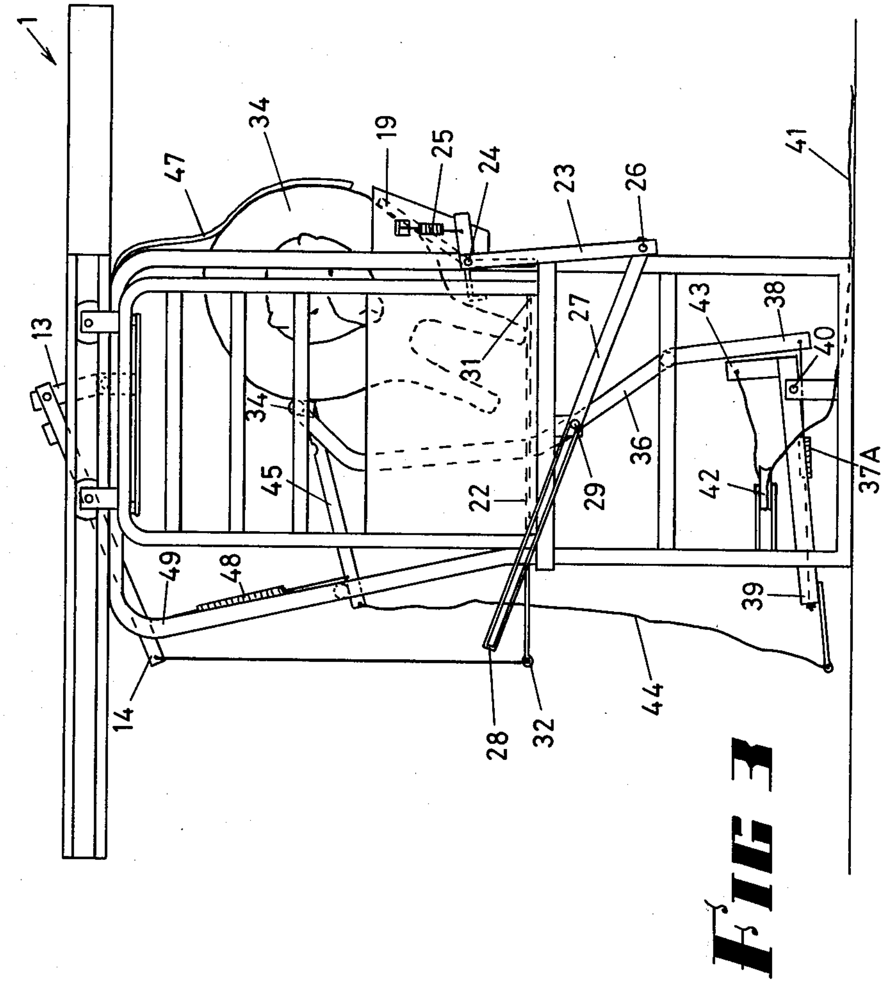
Figure 4:
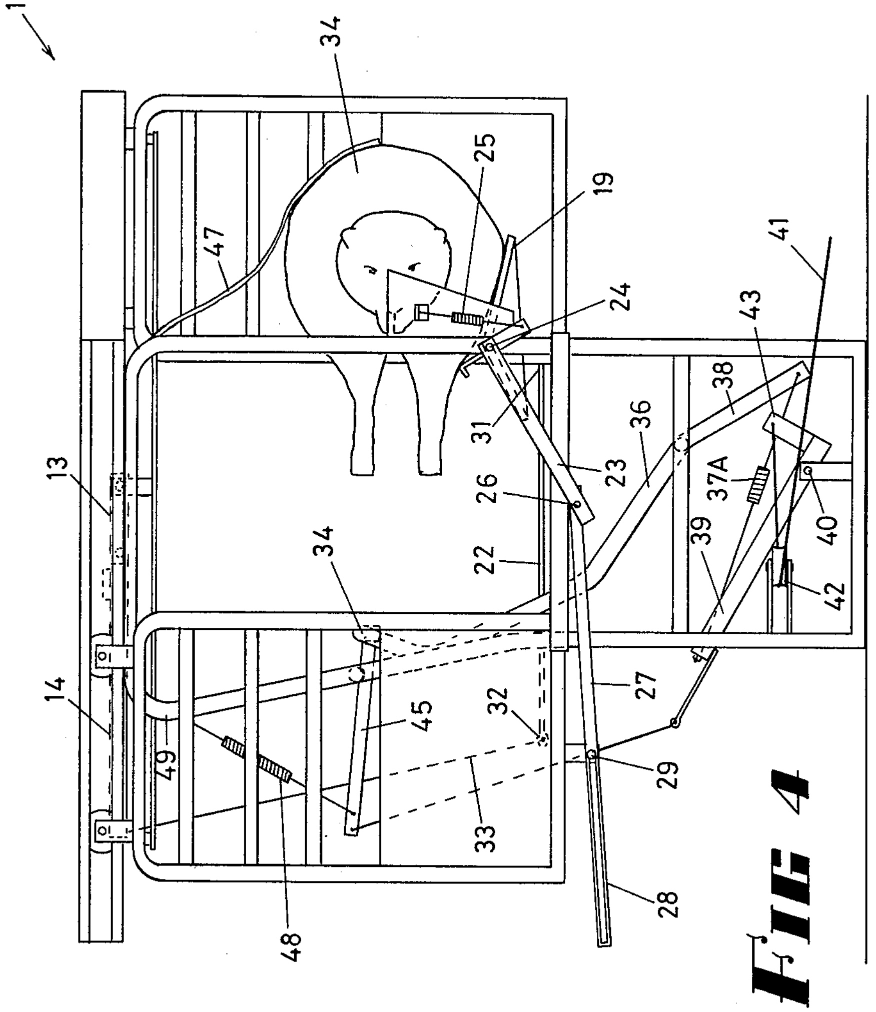

Referring now to the drawings of the preferred embodiment,

FIG. 1 shows a pen according to the preferred embodiment; the drawing is showing the pen in perspective and including on the right-hand side a supply chute for sheep to enter the pen and on the left-hand side a chute located in a crossing direction with respect to the alignment of the pen, FIG. 2 is a view from the end of the pen in this case showing a sheep within the pen in a typical position prior to the gates being closed and with both the supply chute and the crossing chute removed to assist in clarity of the drawing, FIG. 3 is the same view of the pen at the same end as in FIG. 2 except in this case the sheep has been detected as being fully within the pen and has activated the detection and closure means within the pen so that the gates at both ends of the chute are shown in a closed position, and FIG. 4 shows the same view as in FIGS. 2 and 3 of the same embodiment but in this case with the sheep being shown as being typically removed by diversion of a panel within the side of the chute which action moving the panel or as is shown panels effects a re-opening of the gates and a re-setting of the detection and closure means within the pen.

Referring to the drawings in detail the overall arrangement 1 includes a pen 2 which has two sides 3 and 4 oppositely positioned so as to thereby define a chute 5.

At each end of the chute 5 is a gate at the entry end gate 6 and at the other end gate 7.

Each of the gates 6 and 7 is supported by sliding supports, in the case of gate 6 supports 8 and in the case of gate 7 supports 9 so that they can be slidably positioned either in an open position as is shown in FIG. 2 or in a closed position as is shown in FIG. 1.

The positions of the gates 6 and 7 are controlled by a common lever arm 10 which is pivotally supported about a vertical axis at 11 relative to the frame 12 comprising the pen and associated apparatus.

The positions of the gates 6 and 7 are governed by an over-centre lever arrangement comprising levers 13 and 14, lever 13 being connected pivotally at 15 to the arm 10 and lever 14 being connected pivotally at 16 to frame member 17 of the frame 12.

The gates 6 and 7 are resiliently restrained to retain the closed position by reason of helical spring 18 secured at one end to the lever arm 10 and at the other to an extension of the frame 12.

The opening of the gates 6 and 7 is achieved by coupling these to a panel 19 positioned within side 4 of the pen 2.

Panel 19 which extends for the full length of the pen 2 is pivotally supported by pivot supports at 20 and 21 relative to the frame 12 which is so located that it is significantly below any height of a centre of gravity of a sheep that might be standing on the floor 22.

The coupling mechanism includes a lever arm 23 which is secured to the axle 24 which rotates with the panel 19 and at the same time rotates in a radial manner with lever arm 23.

The panel 19 is resiliently restrained to retain a closure position as shown in FIG. 1 by reason of helical spring 25.

Lever arm 23 is connected by reason of pivot connection 26 to push-rod 27 which includes a slot 28 engaging with a lost motion coupling pin 29 coupled to the gate 7.

The effect of this arrangement is that upon the rotation of panel 19 for instance upon the extraction of a sheep such as is shown in FIG. 4, then the rotation of the lever arm 23 will result in push-rod 27 acting against gate 7 which by reason of its coupling to gate 6 through the lever arm 10 will also act against gate 6 to effect an opening of both of these.

By reason of the lost motion coupling, when the panel 19 returns to its closure position relative to the pen 2, this will be permitted by reason of movement of the pin 29 with respect to the slot 28.

Upon an opening of the gates 6 and 7, this will result in the over-centre lever arrangement 13 and 14 taking up the over-centre position and this is retained until the over-centre relationship of levers 13 and 14 is broken.

Within the floor 22 of the pen, there is situated a floor pad 30 which is pivotally secured at 31 and which at an outer end 32 is connected by flexible cord 33 to an end of the lever arm 14.

Accordingly, upon a sheep such as that shown in FIG. 2 as 34 enters the pen, this will depress pad 30 within the floor sufficiently to release the overcentre arrangement allowing spring 18 to pull the gates 6 and 7 into a closed position.

The next mechanism relates to an apparatus by which a sheep while in the pen 2 can be caused to be off balance and this will assist considerably the withdrawal of the sheep from the side of the pen.

The action is achieved by having a pressure member comprising a pressure bar 35 supported by a pivotally supported lever arm 36 this being supported by axle 37 relative to the frame 12.

Pressure to cause the pressure member 35 to act against the sheep is achieved through helical spring 37*a* acting at one end against the further end of the lever arm 36 at 38 and at the other end being adjustably coupled to the upper end of yoke 39.

Yoke 39 is pivotally supported relative to the frame 12 at pivot axis 40.

Loading of the spring with respect to the lever arm 36 is achieved by pressure through flexible cord 41 acting through pulley connection 42 which acts on tab 43 which is secured fixedly to the yoke 39.

The flexible cord 41 is shown as a free end which can be connected to any suitable apparatus to effect the pressure required.

It can typically be coupled to a cradle on which animals from the pen are being treated so that upon selected actions the cord is pulled thereby causing a next animal to be ready to be withdrawn.

Conversely, it can be attached to a foot operated lever arm action which also is not in itself remarkable or it can be directly pulled by an operator without the aid of any mechanical advantage.

Releasing the spring pressure can be achieved by applying pressure on cord 44 which is appropriately coupled as shown to the opening mechanism of the gates 6 and 7 so that with this action the lever arm 36 can be released from its strong spring tension and by reason of the lever 45 can be held in the open position against even the straining pressure until once again significant pressure is exerted on cord 41 to recharge and reload the pressure on pressure member 35.

A significant feature of the arrangement described is the fact that an animal such as a sheep can be enticed by reason of an apparently open chute to walk into the chute which then of course is closed both at a forward and rear end relative to the sheep.

To assist in the forward movement of the sheep however it has been found advantageous to provide a walkway which causes sheep from time to time to move in a cross direction relative to the movement expected of sheep into the pen.

Referring then to FIG. 1, there is shown walkway 45A situated so that sheep walking up the chute 46 will see sheep walking along the walkway 45A in a cross direction and hopefully and indeed in practice this is found to be so in many cases, is attracted by the sheep apparently passing by and the sheep therefore proceed into the pen which of course is then closed.

The side 4 defining the chute has at an upper side a sheet of flexible rubber material shown at 47 which is easily diverted when the sheep is pulled therethrough but which does assist in hiding any activity and distracting movement from the sheep as they proceed into the pen.

It is recognised that many mechanical variations achieving the same objectives can be achieved but the description thus given relates to a preferred embodiment found to be most useful at the present time.

It is noted that lever arm 45 is held in an elevated position by spring 48 having an upper end secured to the frame at 49. Upon downward pressure by cord 44 lever arm 45 is released with respect to a slot interlocking with a portion of the main frame which then allows push member 35 to proceed into an overbalancing position with respect to a sheep 34.

I claim:

1. An arrangement for assisting handling of sheep characterised by including a pen having two sides oppositely positioned to define a chute, a gate positioned at each end of the chute and adapted to close the pen at its ends, each gate positioned and adapted with the chute so that a sheep entering the chute from an inlet end and entering past a first of the said gates can discern an open status of the gate relative to the pen at the other end of the chute, detection and closure means within the pen adapted to detect the presence of a sheep within the pen and adapted to close both said gates upon such detection, said detection and closure means including a floor pad depressable by a sheep entering the pen to actuate gate closing means, and a first of the said two sides having withdrawal means adapted to permit a sheep to be selectively moved through the said side to effect withdrawal of the sheep from the pen.

2. An arrangement for assisting handling of sheep as in claim 1 further characterised in that the said withdrawal means include a panel pivotally supported about a horizontally aligned axis, the panel and its support being arranged so as to be divertible in such a way as to allow a sheep within the pen to be pulled out sideways upon diversion of the panel about its horizontal pivot support axis.

3. An arrangement for assisting handling of sheep as in claim 2 in which the panel pivot support axis is situated at a height relative to a floor within the pen such that it will be at a lesser height than the centre of gravity of a sheep when the sheep is standing on the floor within the pen.

4. An arrangement for assisting handling of sheep as in claim 2 further characterised in that the said panel is interconnected to the gates by coupling means whereby, upon a diversion of the panel about its pivot support with the removal of a sheep therepast, this will effect an opening of each of the gates.

5. An arrangement for assisting handling of sheep as in claim 4 further characterised in that there is included within the pen a pressure member movably supported relative to the pen and adapted in one position to be in an adjacent position relative to a sheep when in the pen, and to be adapted to be moved to press against the side of the sheep to an extent as to assist in overbalancing of the sheep whereby to assist in removal of the sheep from the side of the pen upon diversion of the panel in the said side of the pen.

6. An arrangement for assisting handling of sheep as in claim 1 in which the pen is situated so that a walkway is located in a crossing direction at an end of the pen adjacent the exit gate of the pen and so arranged that a sheep walking along such walkway may be observable by a sheep proceeding into the pen whereby to be attracted thereby.

7. An arrangement for assisting handling of sheep characterised by including a pen having two sides oppositely positioned about, and thereby defining a chute, at each end of the chute, a gate adapted to close the pen at its end, each gate positioned and adapted with the chute so that a sheep entering the chute from an inlet end and entering past a first of the said gates, can discern an open status of the gate relative to the pen at the other end of the chute, detection and closure means within the pen adapted to detect the presence of a sheep within the pen and adapted to close both said gates upon such detection, and a first of the said two sides having withdrawal means adapted to permit a sheep to be selectively moved through the said side to effect withdrawal of the sheep from the pen, said withdrawal means further including a panel pivotally supported about a horizontally aligned axis, the panel and its support being arranged so as to be divertible in such a way as to allow a sheep within the pen to be pulled out sideways upon diversion of the panel about its horizontal pivot support axis, the said panel being interconnected to the gates by coupling means whereby, upon a diversion of the panel about its pivot support with the removal of a sheep therepast, this will effect an opening of each of the gates.

* * * * *